(12) United States Patent
Johnson et al.

(10) Patent No.: US 7,075,003 B2
(45) Date of Patent: Jul. 11, 2006

(54) OUTDOOR ELECTRICAL ENCLOSURE AND MOISTURE-RESISTANT FLANGE AND SIDE ASSEMBLY STRUCTURES THEREFOR

(75) Inventors: Jeffrey L. Johnson, Lincoln, IL (US); Syed M. Karim, Lincoln, IL (US)

(73) Assignee: Eaton Corporation, Cleveland, OH (US)

( * ) Notice: Subject to any disclaimer, the term of this patent is extended or adjusted under 35 U.S.C. 154(b) by 0 days.

(21) Appl. No.: 10/882,571

(22) Filed: Jul. 1, 2004

(65) Prior Publication Data

US 2006/0000629 A1    Jan. 5, 2006

(51) Int. Cl.
*H02G 3/08*    (2006.01)

(52) U.S. Cl. .............................. 174/50; 174/58; 174/59; 220/3.3; 248/205.1

(58) Field of Classification Search .................. 174/50, 174/58, 59; 220/3.9, 3.3, 3.6; 248/205.1, 248/217.2, 216.4
See application file for complete search history.

(56) References Cited

U.S. PATENT DOCUMENTS

| | | | |
|---|---|---|---|
| 4,265,365 A * | 5/1981 | Boteler | 220/3.3 |
| 5,841,068 A * | 11/1998 | Umstead et al. | 174/58 |
| 5,886,868 A | 3/1999 | White et al. | |
| 6,046,904 A | 4/2000 | Kubat | |
| 6,276,099 B1 | 8/2001 | O'Shea | |
| 6,421,229 B1 | 7/2002 | Campbell et al. | |

OTHER PUBLICATIONS

U.S. Appl. No. 10/652,466, filed Aug. 29, 2003, Outdoor Electrical Encl.

* cited by examiner

*Primary Examiner*—Dhiru R. Patel
(74) *Attorney, Agent, or Firm*—Martin J. Moran (57) ABSTRACT

Moisture-resistant flange structures and side assemblies are for an outdoor electrical enclosure adapted to be mounted in an opening, for example, in the wall of a building. The moisture-resistant flange structures include flange elements disposed on side members of the outdoor electrical enclosure without having an aperture extending through the flange element and not having a passageway extending between the flange element and the side member into the opening. The moisture-resistant side assemblies include at least one adjustable generally L-shaped flange element coupled to the first and second side members by fasteners extending through elongated apertures in the adjustable flange elements. Extensions coupled to the side members overlap a portion of each side member and a portion of at least one of the at least one generally L-shaped adjustable flange elements and the elongated aperture extending therethrough.

18 Claims, 7 Drawing Sheets

OUTDOOR ELECTRICAL ENCLOSURE AND MOISTURE-RESISTANT FLANGE AND SIDE ASSEMBLY STRUCTURES THEREFOR

BACKGROUND OF THE INVENTION

1. Field of the Invention

The present invention relates generally to outdoor electrical enclosures and, more particularly, to outdoor electrical enclosures employing a moisture-resistant structure. The invention also relates to moisture-resistant structures for outdoor electrical enclosures.

2. Background Information

Electrical equipment (e.g., without limitation, relays; circuit breakers; electric meters; transformers) used outdoors are typically housed within an enclosure, such as, for example, a housing, such as a box or cabinet, to protect the electrical equipment from the environment and to prevent electrical faults caused by moisture. The enclosure is often mounted, for example, within a prepared opening in the wall of a building.

To comply with weather-resistance standards established by the National Electrical Machinery Association (NEMA), including NEMA 3R standards, known prior art electrical enclosures typically comprise a weather-resistant housing made of folded sheet metal. Frequently, the housing includes a number of flanges, commonly referred to as nail flanges, which are structured to secure the housing in its installed position, for example, within the prepared opening in the wall of the building. The flanges of such electrical enclosures are typically fastened (e.g., without limitation, screwed; riveted; bolted; welded) to the housing in such a way that allows moisture to enter into both the outdoor electrical enclosure itself and the prepared opening in the wall in which it is mounted. This can have undesirable effects within the wall cavity of the building (e.g., without limitation, insulation damage; the development of mold) and, in the event moisture penetrates the enclosure housing, can lead to electrical faults and damage to the electrical equipment. Mold caused by dampness within the wall cavity could result in chronic health problems and ensuing litigation.

Figure 1:
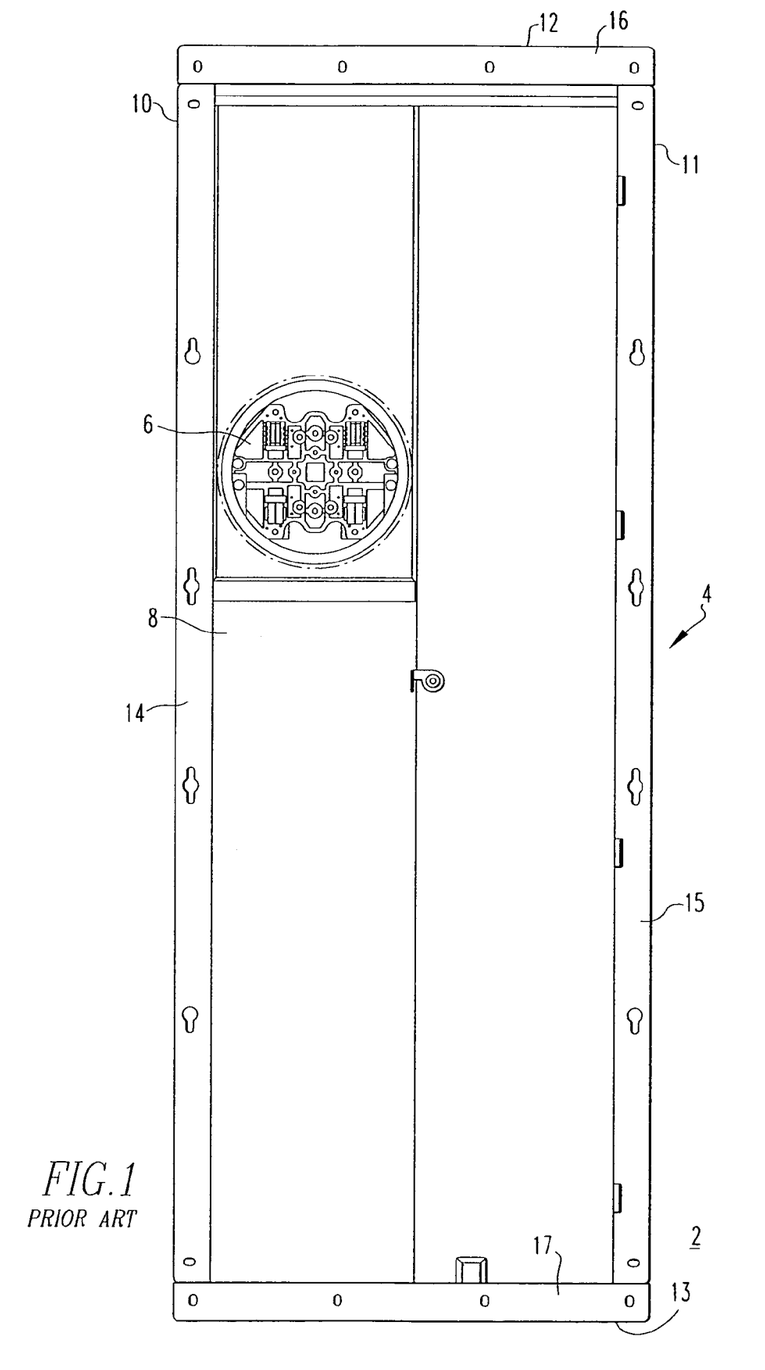
FIG. 1 is a vertical elevational view of a semi-flush panelboard outdoor electrical enclosure including side flanges.
Figure 2:
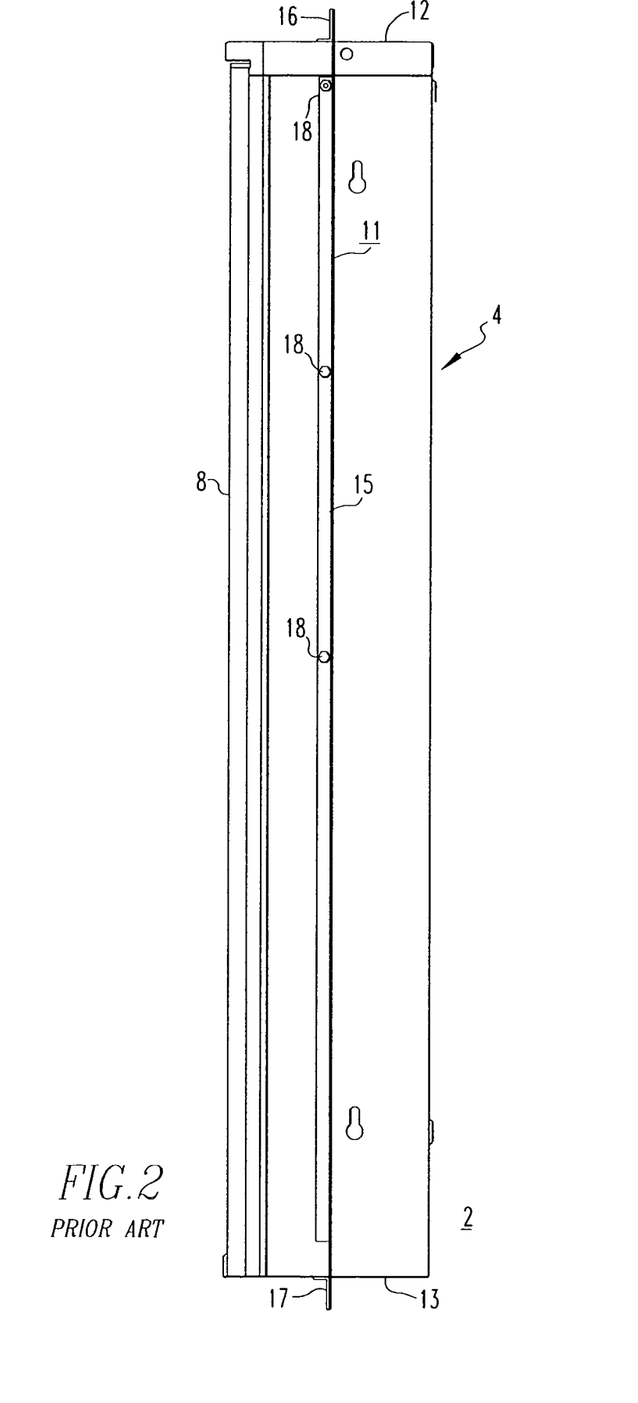
FIG. 2 is an end elevational view of the right side of the outdoor electrical enclosure of FIG. 1, with the meter not shown.

FIGS. 1 and 2 show an outdoor electrical enclosure that employs such flanges. The enclosure shown in FIG. 1 is a semi-flush metered panelboard 2 comprising a wall-mounted box enclosure 4 supporting, for example, electrical switching apparatus (e.g., without limitation, circuit switching devices and circuit interrupters such as circuit breakers, contactors, motor controllers and other load controllers) (not shown). Although not required, a meter 6 (FIG. 1) may provide a visual readout on the front cover 8 of the enclosure 4 of information indicative of electrical conditions related to the panelboard 2. The sides 10, 11 of the enclosure 4 have a number of flanges, such as side flanges 14, 15, respectively. The top 12 and bottom 13 of the enclosure 4 also include top and bottom flanges 16, 17, respectively. These flanges 14, 15, 16, 17 are typically fabricated from steel (e.g., without limitation, galvanized steel; painted steel).

As shown in FIG. 2, the flanges 14, 15, 16, 17 (one side flange 15 is shown on side 11 in FIG. 2) are separately manufactured, generally L-shaped components attached to the enclosure 4 by numerous fasteners 18 (e.g., without limitation, screws; bolts; rivets; welding). Moisture frequently seeps through gaps present between the L-shaped side flanges (e.g., 12, 15) and the top 12 and side 11, for example, of the enclosure 4 and also enters into the prepared wall opening in which the enclosure 4 is mounted (not shown).

To prevent moisture from entering an outdoor electrical enclosure, the flanges of some known outdoor electrical enclosures (not shown) are welded to the housing (not shown). However, the flanges of such designs are typically spot welded and, therefore, still permit moisture to seep between the gaps in between the spot welds (not shown) attaching the flanges to the enclosure.

In addition, it is believed that known outdoor electrical enclosures do not provide any adjustment of the flanges in relation to the enclosure housing or adjustment of the enclosure housing itself (e.g., without limitation, depth, width and height adjustments). This lack of adjustment results in the inability to correct any misalignment and can thereby create additional points of water entry into both the enclosure and the wall in which it is installed. For example, power is generally supplied to the electrical equipment within the outdoor electrical enclosure by electrical wiring disposed within conduit, which typically enters the enclosure housing at the back of the bottom end wall. Absent the ability to adjust the depth of the housing, the conduit projecting from the back thereof can prevent the housing from being pushed back completely within the prepared opening. Gaps resulting from a poor fit within the prepared opening provide yet another point of entry for moisture to penetrate the building wall.

There is a need, therefore, for a simplified, outdoor electrical enclosure and flange structure capable of improved moisture-resistance.

Accordingly, there is room for improvement in flange structures for outdoor electrical enclosures and in outdoor electrical enclosures employing flange structures.

SUMMARY OF THE INVENTION

These needs and others are satisfied by the present invention, which provides moisture-resistant flange and side assembly structures for an outdoor electrical enclosure. The enclosure includes moisture-resistant structures which resist moisture penetration into both the enclosure and the building wall, for example, in which it is mounted, thereby minimizing negative effects such as electrical faults and mold associated therewith.

As one aspect of the invention, a moisture-resistant flange structure is for an outdoor electrical enclosure adapted to be mounted in an opening. The outdoor electrical enclosure includes a back panel and first and second side members extending from the back panel. The moisture-resistant flange structure comprises: a flange element disposed on one of the first and second side members and structured to secure the outdoor electrical enclosure within the opening, the flange element not having an aperture extending through the flange element and not having a passageway extending between the flange element and the one of the first and second side members into the opening.

The flange element may be integral with the one of the first and second side members. One or both of the first and second side members of the outdoor electrical enclosure may include a first portion extending from the back panel and a second portion overlapping the first portion and the flange element may include a third portion engaging the first portion and a fourth portion engaging the second portion.

As another aspect of the invention, a moisture-resistant side assembly is for an outdoor electrical enclosure adapted to be mounted in an opening. The outdoor electrical enclosure includes a back panel and first and second side members extending from the back panel. The moisture-resistant side assembly comprises: at least one adjustable flange element coupled to one of the first and second side members; and an extension coupled to the one of the first and second side members and overlapping a portion of the one of the first and second side members and a portion of one of the at least one adjustable flange element.

The at least one adjustable flange element may be a generally L-shaped adjustable flange element including a base and an integral stem extending substantially perpendicularly from the base; wherein the base is adjustably coupled to the one of the first and second side members by a fastener extending through an elongated aperture formed in the base, wherein the extension overlaps the elongated aperture. Alternatively, the at least one adjustable flange element may include first and second generally L-shaped adjustable flange elements.

As another aspect of the invention, an outdoor electrical enclosure adapted for installation into an opening comprises: a back panel; first and second side members extending from the back panel; and a moisture-resistant flange structure comprising: a flange element disposed on a corresponding one of the first and second side members and structured to secure the outdoor electrical enclosure within the opening the flange element not having an aperture extending through the flange element and not having a passageway extending between the flange element and the corresponding one of the first and second side members into the opening.

As another aspect of the invention, an outdoor electrical enclosure adapted for installation into an opening comprises: a back panel; first and second side members extending from the back panel; and a moisture-resistant side assembly comprising: at least one adjustable flange element coupled to a corresponding one of the first and second side members; and an extension coupled to the corresponding one of the first and second side members and overlapping a portion of the corresponding one of the first and second side members and a portion of at least one of the at least one adjustable flange element coupled thereto.

BRIEF DESCRIPTION OF THE DRAWINGS

A full understanding of the invention can be gained from the following description of the preferred embodiments when read in conjunction with the accompanying drawings in which.

DESCRIPTION OF THE PREFERRED EMBODIMENTS

For purposes of illustration, the present invention will be described as applied to an outdoor electrical enclosure for enclosing electrical equipment (e.g., without limitation, relays; circuit breakers; electric meters; transformers), the enclosure being adapted for mounting within a prepared opening, for example, in the wall of a building. However, it will become apparent that it could also be applied to other types of enclosures adapted for outdoor weather-resistant use and for mounting locations other than within the wall of a building (e.g., without limitation, within the opening of a freestanding mounting unit; as part of a power station).

As employed herein, the term "fastener" refers to any suitable fastening, connecting or tightening mechanism expressly including, but not limited to, screws, bolts and the combination of bolts and nuts.

As employed herein, the statement that two or more parts are "coupled" together shall mean that the parts are joined together either directly or joined through one or more intermediate parts.

As employed herein, the term "number" shall include one or more than one (i.e., a plurality). For example, the statement that the extension of the side member includes a number of bends shall mean that the extension includes one or more bends.

As employed herein, the term "passageway" refers generally to any channel, crevice or any other throughway, for example, without limitation, connecting one location on a structure to another location on the structure. For example, the present invention is designed to eliminate any passageway between a side member of an outdoor electrical enclosure and a flange element disposed thereon. The presence of such a passageway would produce, for example, the undesirable result of moisture traveling through the passageway into the opening in which the enclosure is mounted.

Figure 3:
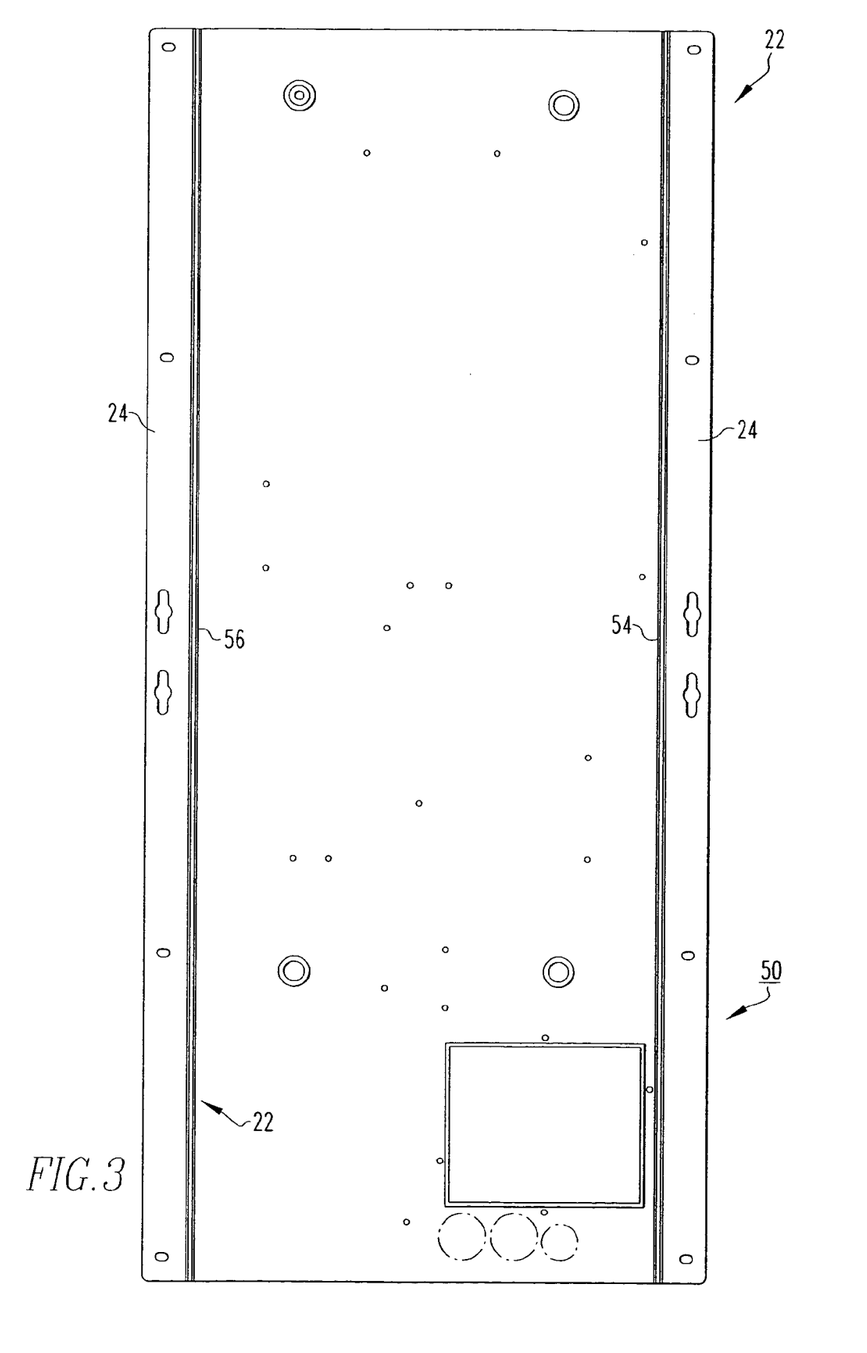
FIG. 3 is a vertical elevational view of an outdoor electrical enclosure including integral moisture-resistant flange structures in accordance with an embodiment of the present invention, with the top, bottom and front cover removed.
Figure 4:
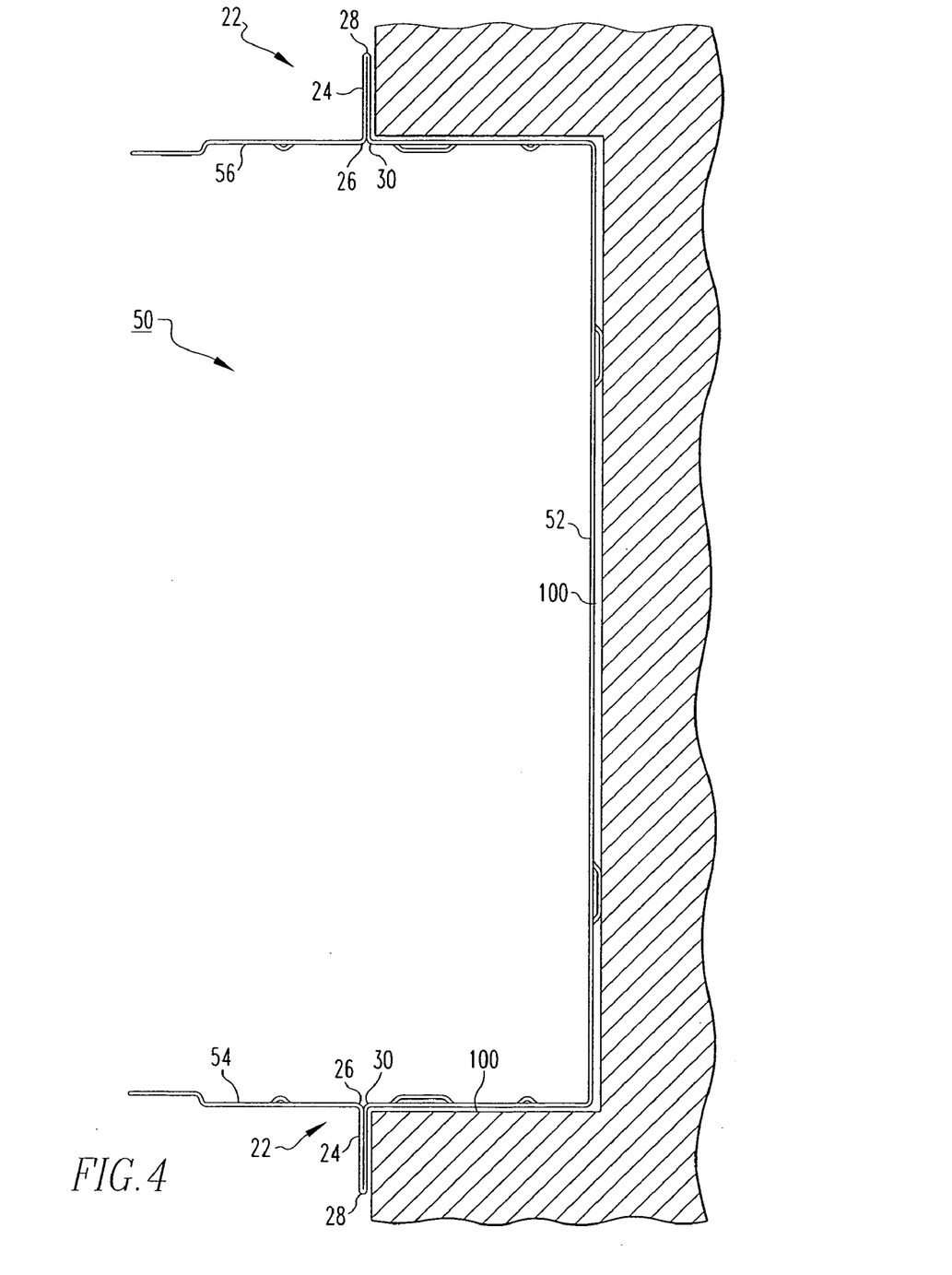
FIG. 4 is a top plan view of the outdoor electrical enclosure of FIG. 3 disposed within an opening in accordance with an embodiment of the invention.

FIGS. 3 and 4 show a moisture-resistant flange structure 22 for an outdoor electrical enclosure 50 which is adapted to be mounted in an opening, shown generically in FIG. 4 as reference 100. The outdoor electrical enclosure 50 generally includes a back panel 52 and first and side members 54, 56 extending from the back panel 52. The moisture-resistant flange structure generally includes a flange element 24 disposed on one or both of the first and second side members 54, 56 and structured to secure the outdoor electrical enclosure 50 within the opening 100 (FIG. 4) while resisting moisture penetration both into the outdoor electrical enclosure 50 and into the opening 100 (FIG. 4) in which it is mounted. Specifically, the flange element 24 does not have an aperture extending through the flange element 24 and further does not have a passageway extending between the flange element 24 and the one of the first and second side members 54, 56 into the opening 100. By eliminating points of entry for moisture to penetrate the electrical enclosure 50 and the opening 100, the moisture-resistant flange structures (e.g., 22, 122 (FIG. 5)) of the present invention minimize negative effects associated therewith (e.g., without limitation, electrical faults; structural damage to the building; formation of mold).

FIG. 4 shows a top plan view of the outdoor electrical enclosure 50 of FIG. 3 as mounted within the opening 100. As shown, in the exemplary moisture-resistant flange structure 22 embodiment of FIGS. 3 and 4, one flange element 24 is integral with each of the first and second side members 54, 56. Accordingly, in this embodiment of the invention, the outdoor electrical enclosure 50 includes two moisture-resistant flange structures 22, one on each of the first and second side members 54, 56. However, it will be appreciated that an alternative number of flange elements (not shown) disposed on the outdoor electrical enclosure (e.g., 50) in a variety of different orientations (not shown) could be employed rather than the structure including the exemplary two flange elements 24 for mounting the outdoor electrical enclosure 50 in opening 100, as shown. For example, without limitation, the outdoor electrical enclosure might be mounted within an opening adjacent a corner (not shown) formed at the juncture of two walls of a building (not shown). In such a location, the outdoor electrical enclosure might only include one flange element (not shown) on only one of the first and second side members (e.g., 54, 56), in order to secure the enclosure within the opening (not shown) while permitting it to be mounted flush against the corner (not shown).

Continuing to refer to FIG. 4, for simplicity of disclosure, the exemplary moisture-resistant flange structure 22 will be discussed in terms of one of the exemplary pair of flange elements 24, and the side member 54, 56 on which it is disposed. Specifically, the exemplary integral flange element 24 on first side member 54 will now be described. However, it will be appreciated the following disclosure is equally applicable to moisture-resistant flange structure 22 on second side member 56. As previously discussed, in the embodiment of FIGS. 3 and 4, the flange element 24 is integral with first side member 54. The exemplary integral flange element 24 includes a generally right-angled bend 26 that extends substantially perpendicular from the first side member 54, a second bend 28 of about 180 degrees that turns back toward the first side member 54, and a third generally right-angled bend 30, in order to form the flange element as an integral projection 24 extending substantially perpendicularly from the first side member 54. It will be appreciated that the exemplary substantially perpendicular, integral flange element 24 provides a flush mounting engagement with the surface of the wall having the opening 100 (FIG. 4) in which the enclosure 50 is mounted, while substantially eliminating points of water entry into both the enclosure 50 and the opening 100, which are otherwise known to exist in the prior art.

Figure 5:
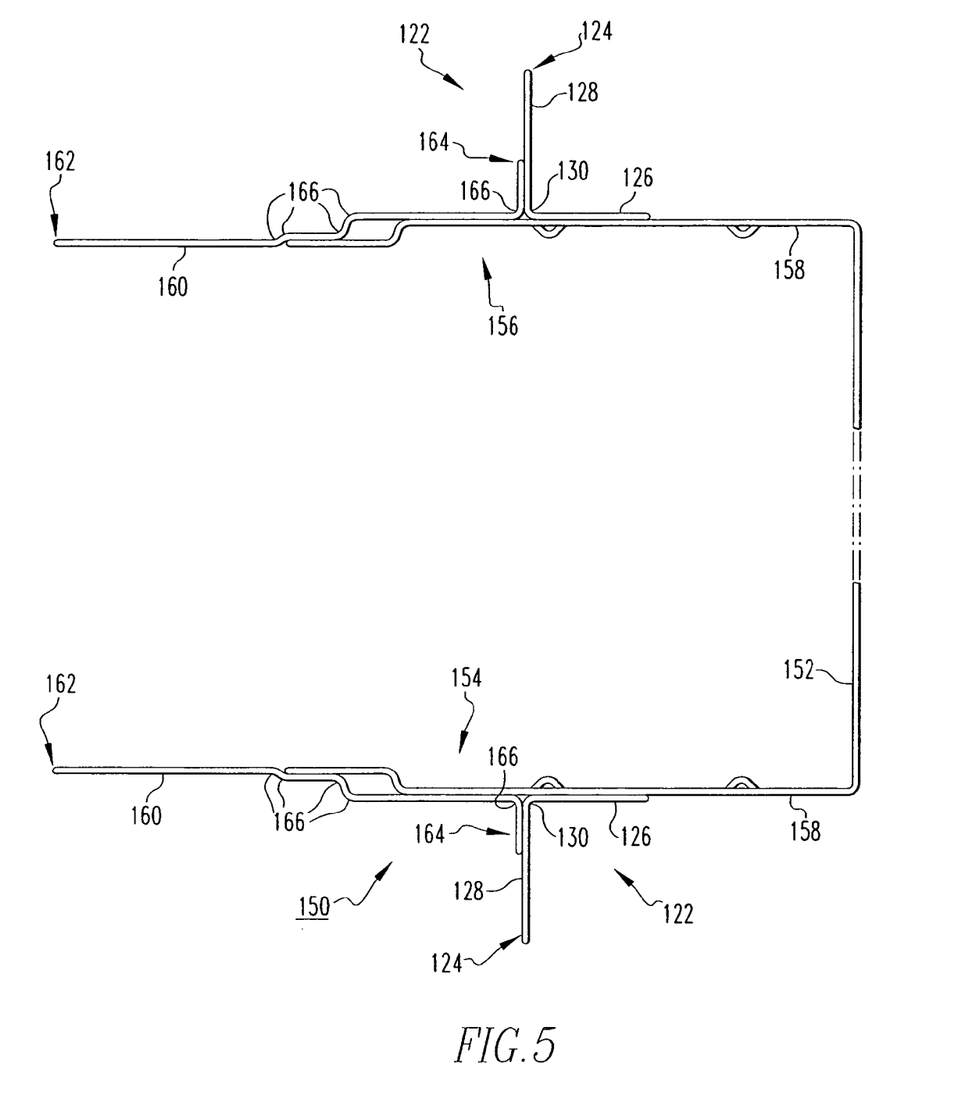
FIG. 5 is a top plan view of an outdoor electrical enclosure including stationary moisture-resistant flange structures in accordance with another embodiment of the invention.

FIG. 5 shows a moisture-resistant flange structure 122 in accordance with another embodiment of the present invention. As with the embodiment of FIGS. 3 and 4, for simplicity, only one moisture-resistant flange structure 122 as disposed on first side member 154 of the outdoor electrical enclosure 150 will now be discussed. However, it will be appreciated that an identical flange structure 122 may also be disposed on the second side member 156. In the embodiment of FIG. 5, the first side member 154 includes a first portion 158 extending from the back panel 152 and a second portion 160 overlapping the first portion 158. The flange element 124 includes a third portion 126 engaging the first portion 158 of first side member 154 and a fourth portion 128 engaging the second portion 160 of first side member 154. The exemplary flange element 124 further includes a generally right-angled bend 130 between the third and fourth portions 126, 128 in order that the third portion 126 is substantially parallel to the first portion 158 and the fourth portion 128 extends substantially perpendicularly therefrom, as shown. The exemplary second portion 160 of first side member 154 further includes first and second ends 162, 164 and a number of bends 166 therebetween. The exemplary second end 164 of the exemplary second portion 160 is integral with, off-set from and substantially perpendicular in relation to the first end 162 thereof, as shown. Specifically, the exemplary bends of the second portion 160 include at least one generally right-angled bend 166 proximate the second end 164 in order that the second portion 160 engages both the first portion 158 of the first side member 154 and the fourth portion 128 of the flange element 124. It will, however, be appreciated that both the first and second portions 158, 160 of the outdoor electrical enclosure 150 side member (e.g., 154) could alternatively include any number of bends (not shown) in order that the portions (e.g., 158, 160; 126, 128) overlap in any alternative suitable moisture-resistant relationship (not shown).

Like the integral flange element 24 embodiment of FIGS. 3 and 4, the flange element 124 embodiment of FIG. 5 also provides a stationary mounting structure with improved moisture-resistant features. Specifically, it has no opening extending through the flange element 124 into the enclosure 150 and no passageway for water to travel between the flange element 124 and the side member (e.g., 154) into the opening (e.g., 100 (FIG. 4)). For example, without limitation, the flange element 124 may be welded or otherwise suitably coupled to the side member (e.g., 154) such that no passageway is formed.

Figure 6:
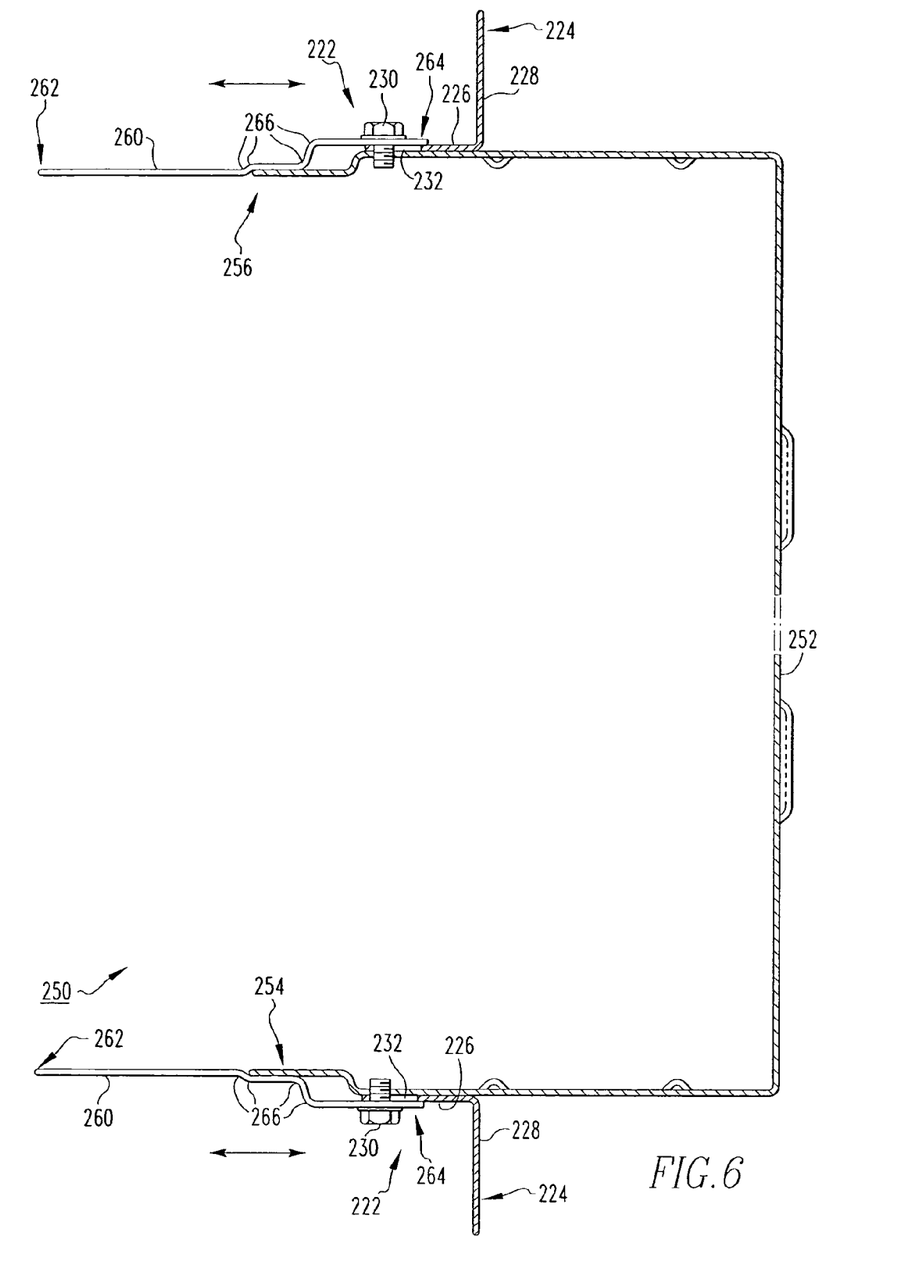
FIG. 6 is a top plan view of an outdoor electrical enclosure including adjustable, moisture-resistant flange structures having a single fastener in accordance with another embodiment of the invention, with the top, bottom and front panel of the enclosure removed.
Figure 7:
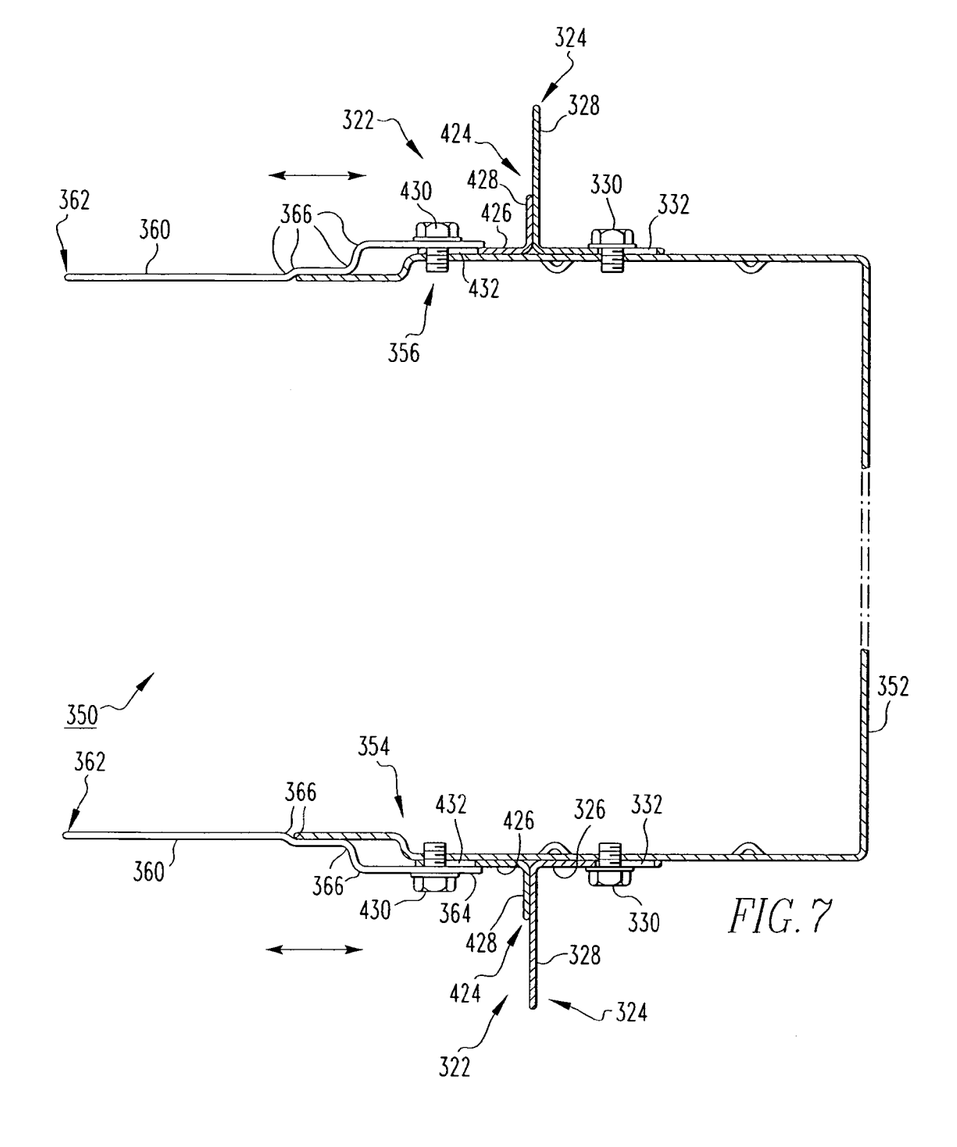
FIG. 7 is a top plan view of an outdoor electrical enclosure including adjustable, moisture-resistant flange structures with two fasteners in accordance with another embodiment of the invention.

FIGS. 6 and 7 illustrate moisture-resistant side assemblies 222, 322 for respective outdoor electrical enclosures 250, 350 adapted to be mounted in an opening (e.g., 100 (FIG. 4)) and including at least one adjustable flange element (e.g., 224; 324, 424) coupled to one or both of the first and second side members (e.g., 254, 354; 256, 356) of the outdoor electrical enclosure (e.g., 250, 350). Like the foregoing discussion of FIGS. 3, 4 and 5, the following discussion in connection with the embodiments of FIGS. 6 and 7 will, for simplicity of disclosure, discuss only one side member (e.g., 254, 354) of the outdoor electrical enclosure (e.g., 250, 350).

Referring first to FIG. 6, the moisture-resistant side assembly 222, similar to the moisture-resistant flange structures of FIGS. 3, 4 and 5, are for an outdoor electrical enclosure 250 adapted to be mounted in an opening (e.g., 100 (FIG. 4)) and include a back panel 252 and first and second side member 254, 256 extending from the back panel 252. The moisture-resistant side assembly 222 generally includes at least one adjustable flange element 224 coupled to one of the first and second side members 254, 256. The exemplary moisture-resistant side assembly 222 includes a generally L-shaped adjustable flange element 224 including a base 226 and an integral stem 228 extending substantially perpendicularly from the base 226. The moisture-resistant side assembly 222 also includes an extension 260 coupled to first side member 254 and overlapping a portion of first side member 254 and a portion of one of the at least one adjustable flange element (the exemplary extension 260 of FIG. 6 overlaps base 226 of generally L-shaped adjustable flange element 224). As shown, the exemplary base 226 of the exemplary generally L-shaped adjustable flange element 224 is adjustably coupled to the first side member 254 by a fastener 230 extending through an elongated aperture 232 formed in the base 226. The extension 260 overlaps the elongated aperture 232, sealing it from the elements and thereby resisting moisture from entering the enclosure 250 and causing, for example, an electrical fault, as previously discussed. Accordingly, like the moisture resistant flange structures 22, 122 discussed above in connection with FIGS. 3, 4 and 5, the overlapping structures of the moisture-resistant side assembly 222, 322 embodiments of FIGS. 6 and 7 (discussed below) have no direct opening extending through the flange element (e.g., 224, 324, 424) into the enclosure (e.g., 250, 350) and no passageway for water to travel between the flange element (e.g., 224, 324, 424) and side member (e.g., 254, 354) into the opening (e.g., 100 (FIG. 4)).

FIG. 7 illustrates a moisture-resistant side assembly 322 embodiment wherein the exemplary at least one adjustable flange element includes first and second generally L-shaped adjustable flange elements 324, 424. The first generally L-shaped adjustable flange element 324, like the generally L-shaped adjustable flange element 224 discussed in connection with FIG. 6, includes a base 326 and an integral stem 328 extending substantially perpendicularly therefrom. The second generally L-shaped adjustable flange element 424 includes a foot 426 and an integral leg 428 extending substantially perpendicularly therefrom, as shown. The base 326 of the first generally L-shaped adjustable flange element 324 and the foot 426 of the second generally L-shaped adjustable flange element 424 are adjustably coupled to the first side member 354 by first and second fasteners 330, 430 extending through first and second elongated apertures 332, 432 formed in the base 326 and the foot 426, respectively. The integral leg 428 of the exemplary second generally L-shaped adjustable flange element 424 overlaps a portion of the integral stem 328 of the exemplary first generally L-shaped adjustable flange element 324, as shown.

Accordingly, improved moisture-resistance is provided by the fact that the base 326 of the exemplary first generally L-shaped adjustable flange element 324 and the first elongated aperture 332 extending therethrough are adapted to be disposed within the opening (e.g., 100 (FIG. 4)) for the outdoor electrical enclosure 350, thereby being shielded from the elements and preventing moisture from entering the enclosure 350. Additionally, the exemplary extension 360 overlaps the second elongated aperture 432 extending through the foot 426 of the exemplary second generally L-shaped adjustable flange element 424, protecting it from the elements in order to further resist moisture from entering the enclosure 350, for example, by penetrating the elongated aperture 432 through which the fastener 430 is disposed. It will be appreciated that although the foregoing discussion was directed toward the moisture-resistant side assembly 322 of first side member 354, it is equally applicable to a moisture-resistant side assembly 322 which, as previously discussed, may or may not be coupled to second side member 356 (FIG. 7 includes identical moisture-resistant side assemblies 322 on both the first and second side members 354,356).

As shown in the embodiments of FIGS. 6 and 7, the exemplary extensions 260 (FIG. 6), 360 (FIG. 7) of first side members 254 (FIG. 6), 354 (FIG. 7) each include first 262, 362 and second ends 264, 364 and a number of bends 266, 366 therebetween. For example, referring to FIG. 7, the exemplary extension 360 includes four bends 366 between the first and second ends 362, 364 thereof, in order that the second end 364 is integral with, off-set from and substantially parallel to the first end 362. Like the second end 264 of extension 260, which overlaps the elongated aperture 232 in the base 226 of generally L-shaped adjustable flange element 224, discussed previously in connection with the embodiment of FIG. 6, in this embodiment, the second end 364 of exemplary extension 360 overlaps the second elongated aperture 432 extending through the foot 426 of the second, generally L-shaped adjustable flange element 424.

Accordingly, the single generally L-shaped adjustable flange element 224 shown in FIG. 6 and the first and second generally L-shaped adjustable flange elements 324, 424 of the embodiment of FIG. 7 affectively resist moisture from entering into both the interior of the enclosure 250, 350 and into the opening (e.g., 100 (FIG. 4)) in which it is mounted, while further providing adjustment of, for example, the depth of the enclosure (e.g., 250, 350). The adjustable capabilities of the exemplary moisture-resistant side assemblies 222, 322 of FIGS. 6 and 7 provide still further resistance to moisture penetration into the opening (e.g., 100 (FIG. 4)) by permitting the side members (e.g., 254, 354; 256, 356) to be adjusted until the desired fit within the opening (e.g., 100 (FIG. 4)) is achieved. By achieving a secure fit, for example by properly adjusting the enclosure (e.g., 350, 250) until it is aligned within the opening 100 without the presence of gaps, for example, between the flange elements (e.g., 224; 324) and the wall (not shown) in which the enclosure (e.g., 250, 350) is mounted, additional points of water entry into the mounting opening (e.g., 100 (FIG. 4)) are substantially eliminated (see, for example, the previous discussion in connection with FIGS. 1 and 2 regarding misalignment resulting from the gaps (not shown) which typically permit water to enter the enclosure at the bottom of the back panel).

Therefore, the moisture-resistant flange structures (e.g., 22, 122) and side assembly structures (e.g., 222, 322) of the present invention improve moisture resistance into the outdoor electrical enclosure (e.g., 50, 150, 250, 350) itself as well as resisting moisture penetration into the opening (e.g., 100 (FIG. 4)) in which the enclosure is mounted, thereby eliminating the undesirable consequences associated therewith (e.g., without limitation, electrical faults; formation of mold; structural damage). The adjustable side assembly structures (e.g., 222, 322) further provide adjustment of the enclosure (e.g., 250, 350) to enable a secure, watertight fit within the mounting opening (e.g., 100 (FIG. 4)).

It will be appreciated that variations in the configuration of the exemplary integral, adjustable and overlapping moisture-resistant flange element and side member structures could be employed in addition to those illustrated in FIGS. 3–7 and discussed herein. It will also be appreciated that top and bottom moisture-resistant flanges (not shown) are typically provided for the enclosure (e.g., 50, 150, 250, 350). Such top and bottom flanges (not shown) may include the same integral and overlapping structures of the aforementioned flange elements and side assemblies of the present invention. Alternatively, it will be appreciated that the top and bottom flanges (not shown) could have any suitable moisture-resistant structure (not shown) (e.g., without limitation, an overlapping flange including a bend of about 180 degrees in order to form a pocket (not shown) for receiving and overlapping the side flanges of the enclosure). Accordingly, the top and bottom flanges, like the aforementioned flange elements and side assemblies, provide improved moisture-resistance in comparison with, for example, the separate L-shaped top and bottom flange structures (e.g., 16, 17) discussed previously in connection with FIGS. 1 and 2.

While specific embodiments of the invention have been described in detail, it will be appreciated by those skilled in the art at various modifications and alternatives to those details could be developed in light of the overall teachings of the disclosure. Accordingly, the particular arrangements disclosed are meant to be illustrative only and not limiting as to scope of invention which is to be given the full breadth of the claims appended and any and all equivalents thereof.

What is claimed is:

1. A moisture-resistant flange structure for an outdoor electrical enclosure adapted to be mounted in an opening, said outdoor electrical enclosure including a back panel and first and second side members extending from said back panel, said moisture-resistant flange structure comprising:
a flange element disposed on one of said first and second side members and structured to secure said outdoor electrical enclosure within said opening, said flange element not having an aperture extending through said flange element and not having a passageway extending between said flange element and said one of said first and second side members into said opening,
wherein said flange element is integral wish said one of said first and second side members and includes a first generally right-angled bend that extends substantially perpendicular from said one of said first and second side members, a second bend of about 180 degrees that turns back toward said one of said first and second side members, and a third generally right-angled bend, in order to provide said flange element as an integral projection extending substantially perpendicularly from said one of said first and second side members.

2. A moisture-resistant flange structure for an outdoor electrical enclosure adapted to be mounted in an opening, said outdoor electrical enclosure including a back panel and first and second side members extending from said back panel, said moisture-resistant flange structure comprising: a flange element disposed on one of said first and second side members and structured to secure said outdoor electrical enclosure within said opening, said flange element not having an aperture extending through said flange element and not having a passageway extending between said flange element and said one of said first and second side members into said opening; and
wherein said one of said first and second side members includes a first portion extending from said back panel and a second portion overlapping said first portion; and wherein said flange element includes a third portion engaging said first portion and a fourth portion engaging said second portion.

3. The moisture-resistant flange structure of claim 2 wherein said flange element includes a generally right-angled bend between said third and fourth portions in order that said third portion is substantially parallel to said first portion and said fourth portion extends substantially perpendicularly therefrom.

4. The moisture-resistant flange structure of claim 2 wherein said second portion includes first and second ends, and a number of bends between the first and second ends thereof, in order that the second end is integral with, off-set from and substantially perpendicular in relation to the first end.

5. The moisture-resistant flange structure of claim 4 wherein said number of bends of said second portion includes at least one generally right-angled bend proximate the second end thereof in order that said second portion engages both said first portion of said one of said first and second side members and said fourth portion of said flange element.

6. A moisture-resistant side assembly for an outdoor electrical enclosure adapted to be mounted in an opening, said outdoor electrical enclosure including a back panel and first and second side members extending from said back panel, said moisture-resistant side assembly comprising:
at least one adjustable flange element coupled to one of said first and second side members; and
an extension coupled to said one of said first and second side members and overlapping a portion of said one of said first and second side members and a portion of one of said at least one adjustable flange element.

7. The moisture-resistant side assembly of claim 6 wherein said at least one adjustable flange element is a generally L-shaped adjustable flange element including a base and an integral stem extending substantially perpendicularly from said base; wherein said base is adjustably coupled to said one of said first and second side members by a fastener extending through an elongated aperture formed in said base; and wherein said extension overlaps said elongated aperture.

8. The moisture-resistant side assembly of claim 6 wherein said at least one adjustable flange element includes first and second generally L-shaped adjustable flange elements, said first generally L-shaped adjustable flange element including a base and an integral stem extending substantially perpendicularly therefrom, said second generally L-shaped adjustable flange element including a foot and an integral leg extending substantially perpendicularly therefrom; wherein said base of said first generally L-shaped adjustable flange element and said foot of said second generally L-shaped adjustable flange element are adjustably coupled to said one of said first and second side members by first and second fasteners extending through first and second elongated apertures formed in said base and said foot, respectively; wherein said integral leg of said second generally L-shaped adjustable flange element overlaps a portion of said integral stem of said first generally L-shaped adjustable flange element; wherein said base of said first generally L-shaped adjustable flange element and said first elongated aperture extending therethrough are adapted to be disposed within the opening for said outdoor electrical enclosure; and wherein said extension overlaps said second elongated aperture extending through said foot of said second generally L-shaped adjustable flange element.

9. An outdoor electrical enclosure adapted for installation into an opening, said outdoor electrical enclosure comprising:
a back panel;
first and second side members extending from said back panel; and
a moisture-resistant flange structure comprising:
a flange element disposed on a corresponding one of said first and second side members and structured to secure said outdoor electrical enclosure within said opening, said flange element not having an aperture extending through said flange element and not having a passageway extending between said flange element and said corresponding one of said first and second side members into said opening,
wherein said flange element is integral with said corresponding one of said first and second side members and includes a first generally right-angled bend that extends substantially perpendicular from said corresponding one of said first and second side members, a second bend of about 180 degrees that turns back toward said corresponding one of said first and second side members, and a third generally right-angled bend, in order to provide said flange element as an integral projection extending substantially perpendicularly from said corresponding one of said first and second side members.

10. An outdoor electrical enclosure adapted for installation into an opening, said outdoor electrical enclosure comprising:
a back panel;
first and second side members extending from said back panel; and
a moisture-resistant side assembly comprising:
at least one adjustable flange element coupled to a corresponding one of said first and second side members; and
an extension coupled to said corresponding one of said first and second side members and overlapping a portion of said corresponding one of said first and second side members and a portion of at least one of said at least one adjustable flange element coupled thereto.

11. The outdoor electrical enclosure of claim 10 wherein said at least one adjustable flange element is a generally L-shaped adjustable flange element including a base and an integral stem extending substantially perpendicularly from said base; wherein said base is adjustably coupled to said corresponding one of said first and second side members by a fastener extending through an elongated aperture formed in said base; and wherein said extension overlaps said elongated aperture.

12. The outdoor electrical enclosure of claim 11 wherein said extension includes a first end, a second end and a number of bends therebetween in order that the second end is integral with, offset from and substantially parallel to the first end; and wherein the second end of said extension overlaps said elongated aperture formed in said base of said generally L-shaped adjustable flange element.

13. The outdoor electrical enclosure of claim 10 wherein said at least one adjustable flange element includes first and second generally L-shaped adjustable flange elements, said first generally L-shaped adjustable flange element including a base and an integral stem extending substantially perpendicularly therefrom, said second generally L-shaped adjustable flange element including a foot and an integral leg extending substantially perpendicularly therefrom; wherein said base of said first generally L-shaped adjustable flange element and said foot of said second generally L-shaped adjustable flange element are adjustably coupled to said corresponding one of said first and second side members by first and second fasteners extending through first and second elongated apertures formed in said base and said foot, respectively; wherein said integral leg of said second generally L-shaped adjustable flange element overlaps a portion of said integral stem of said first generally L-shaped adjustable flange element; wherein said base of said first generally L-shaped adjustable flange element and said first elongated aperture extending therethrough are adapted to be disposed within the opening for said outdoor electrical enclosure; and wherein said extension overlaps said second elongated aperture extending through said foot of said second generally L-shaped adjustable flange element.

14. The outdoor electrical enclosure of claim 13 wherein said extension includes a first end, a second end and a number of bends therebetween in order that the second end is integral with, offset from and substantially parallel to the first end; and wherein the second end of said extension overlaps said second elongated aperture extending through said foot of said second, generally L-shaped adjustable flange element.

15. An outdoor electrical enclosure adapted for installation into an opening, said outdoor electrical enclosure comprising:
a back panel;
first and second side members extending from said back panel; and
a moisture-resistant flange structure comprising:
a flange element disposed on a corresponding one of said first and second side members and structured to secure said outdoor electrical enclosure within said opening said flange element not having an aperture extending through said flange element and not having a passageway extending between said flange element and said corresponding one of said first and second side members into said opening; and
wherein said corresponding one of said first and second side members includes a first portion extending from said back panel and a second portion overlapping said first portion; and wherein said flange element includes a third portion engaging said first portion and a fourth portion engaging said second portion.

16. The outdoor electrical enclosure of claim 15 wherein said flange element includes a generally right-angled bend between said third and fourth portions in order that said third portion is substantially parallel to said first portion and said fourth portion extends substantially perpendicularly therefrom.

17. The outdoor electrical enclosure of claim 15 wherein said second portion includes first and second ends, and a number of bends between the first and second ends thereof, in order that the second end is integral with, off-set from and substantially perpendicular in relation to the first end.

18. The outdoor electrical enclosure of claim 17 wherein said number of bends of said second portion includes at least one generally right-angled bend proximate the second end thereof in order that said second portion engages both said first portion of said corresponding one of said first and second side members and said fourth portion of said flange element.

* * * * *